United States Patent [19]

Colescott

[11] Patent Number: 5,268,890
[45] Date of Patent: Dec. 7, 1993

[54] SELF-CLEANING OPTICAL DISC SYSTEM

[75] Inventor: Willis G. Colescott, Kokomo, Ind.

[73] Assignee: Delco Electronics Corporation, Kokomo, Ind.

[21] Appl. No.: 15,019

[22] Filed: Feb. 9, 1993

[51] Int. Cl.⁵ .................................................. G11B 3/58
[52] U.S. Cl. ..................................... 369/71; 15/256.5
[58] Field of Search .................... 369/71; 360/128; 15/DIG. 12, 171, 159 R, 250 R, 250.1, 256.5

[56] References Cited

U.S. PATENT DOCUMENTS

| | | |
|---|---|---|
| 2,993,698 | 7/1961 | Stanton . |
| 2,995,825 | 10/1960 | Starr . |
| 4,817,078 | 3/1989 | Iwata .................................. 369/71 |
| 4,870,636 | 9/1989 | Yamamoto ......................... 369/292 |
| 4,947,029 | 8/1990 | Kurihara et al. ................... 235/475 |
| 5,038,336 | 8/1991 | Kitazawa ........................... 369/71 |
| 5,040,160 | 8/1991 | Moriya ............................... 369/71 |
| 5,043,968 | 8/1991 | Ohmori .............................. 369/71 |
| 5,084,853 | 1/1992 | Endoh ................................ 369/71 |
| 5,088,082 | 2/1992 | Yamada et al. .................... 369/71 |
| 5,088,083 | 2/1992 | Olson ................................. 369/71 |
| 5,117,411 | 5/1992 | Nakagawa ......................... 369/72 |

FOREIGN PATENT DOCUMENTS

| | | | |
|---|---|---|---|
| 61-237236 | 10/1986 | Japan | 369/71 |
| 62-88124 | 4/1987 | Japan | 360/128 |
| 2-193330 | 7/1990 | Japan | 369/71 |
| 3-59824 | 3/1991 | Japan | 369/71 |
| 4-172630 | 6/1992 | Japan | 369/71 |

*Primary Examiner*—Stuart S. Levy
*Assistant Examiner*—Paul J. Ditmyer
*Attorney, Agent, or Firm*—Anthony Luke Simon; Mark A. Navarre

[57] ABSTRACT

An optical disc system includes a motorized rack assembly for indexing an optical element in a optical disc system across an optical disc enabling the optical element to read information from the optical disc. A controller controls the motorized rack assembly to index the optical element to a cleaning position exterior of an outer perimeter of the optical disc. A brush is located exterior of the outer perimeter of the optical disc for removing debris from the optical element and the controller controls the motorized rack assembly to bring the optical element in contact with the brush to affect removal of accumulated debris from the optical element.

1 Claim, 2 Drawing Sheets

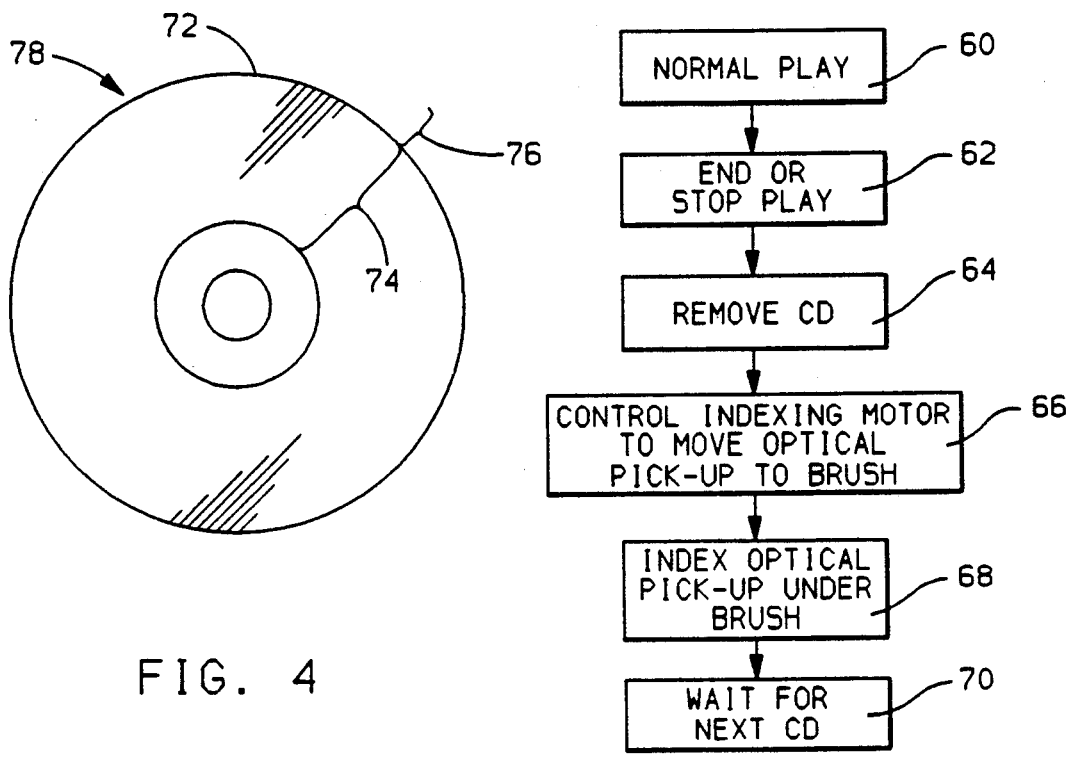
FIG. 4
FIG. 6
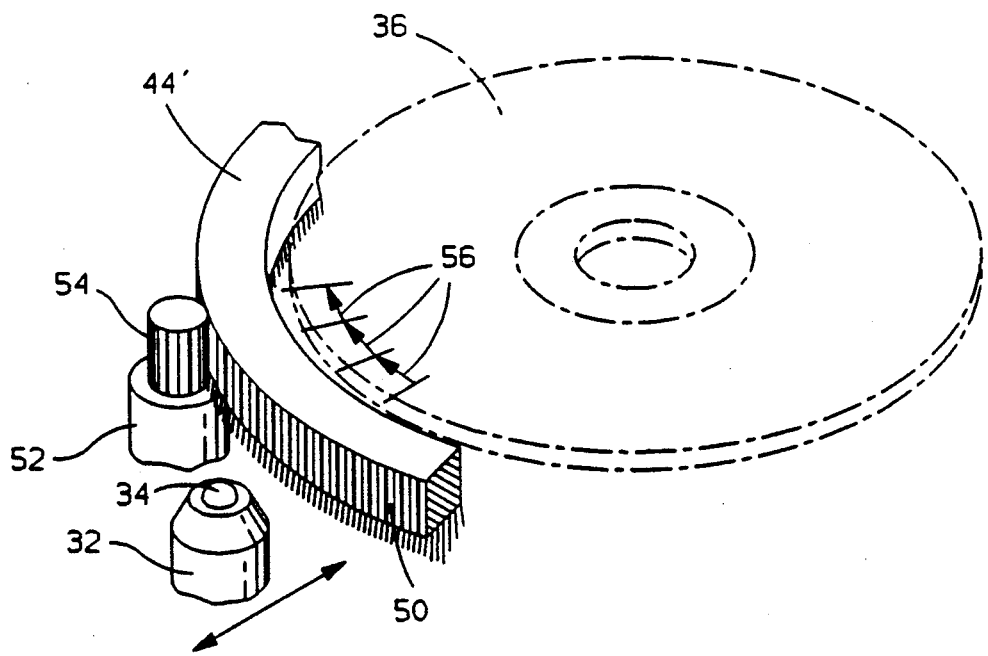
FIG. 5

SELF-CLEANING OPTICAL DISC SYSTEM

This invention relates to compact disc players, and more particularly, to a compact disc player that provides automatic optical element cleaning.

BACKGROUND OF THE INVENTION

Compact disc players use optical elements that include laser devices to read information stored in compact discs and use that information in audio systems or other form of data systems. Audio compact disc systems can be found in home stereo systems, portable stereos and in vehicle stereos. For the optical element to remain operational, it must be relatively clean so that its optical properties are not disturbed. Extended use of a compact disc player tends to allow dust and other debris to collect on the optical element, preventing it from functioning properly and inhibiting use of the compact disc player.

One known method for addressing this problem is to insert a cleaning disc, on which is mounted one or more brushes, into the compact disc player, when the cleaning disc is inserted into the disc player, the player begins spinning the disc, reads commands off of the disc and moves the optical element to bring the brushes in contact with the surface of the optical element, thereby removing dust and debris from the optical element. One shortcoming of this method is that it requires a separate cleaning disc to be used with the system.

A second shortcoming to the cleaning disc method is that some systems have exposed internal mechanical parts, which parts are lubricated for efficient operation, when the brushes on the cleaning disc come in contact with these exposed mechanical parts, they can pick up oil or grease and then deposit such oil or grease on the optical element, thereby making the optical element more contaminated and dirtier instead of cleaner.

SUMMARY OF THE INVENTION

This invention provides an apparatus and method for an optical disc system that cleans the optical element of the system. Advantageously, the apparatus of this invention does not require a separate cleaning disc to clean the optical element. Advantageously, the apparatus of this invention is capable of cleaning the optical element with every set number of hours of use of the optical disc player, or with every use of the optical disc player, providing periodic cleaning, throughout the lifetime of the unit. Advantageously, the apparatus of this invention incorporates a cleaning device for the optical element within the optical disc player.

Advantageously, the apparatus of this invention comprises (a) means for indexing an optical element in an optical disc system across an optical disc enabling the optical element to read information from the optical disc, (b) means for indexing the optical element to a cleaning position exterior of an outer perimeter of the optical disc, (c) brush means, located exterior of the outer perimeter of the optical disc, for removing debris from the optical element and (d) means for bringing the optical element in contact with the brush means to effect removal of accumulated debris from the optical element.

Advantageously, the method of this invention comprises the steps of operating an optical disc system in normal play or data retrieval mode, ceasing play or data retrieval from the optical disc, removing the optical disc from the system, controlling an indexing motor to move the optical element into proximity of a cleaning brush, indexing the optical element under the cleaning brush to affect contact between the cleaning brush and optical element, causing removal of dust and debris from the optical element, and waiting for insertion of a new optical disc.

A more detailed description of this invention, along with various embodiments thereof, is set forth below.

BRIEF DESCRIPTION OF THE DRAWINGS

FIG. 4 illustrates an optical disc and areas interior and exterior the outer perimeter of the optical disc.

FIG. 5 illustrates an indexing cleaning brush according to this invention.

FIG. 6 illustrates the method of this invention.

DETAILED DESCRIPTION OF THE INVENTION

Figure 1:
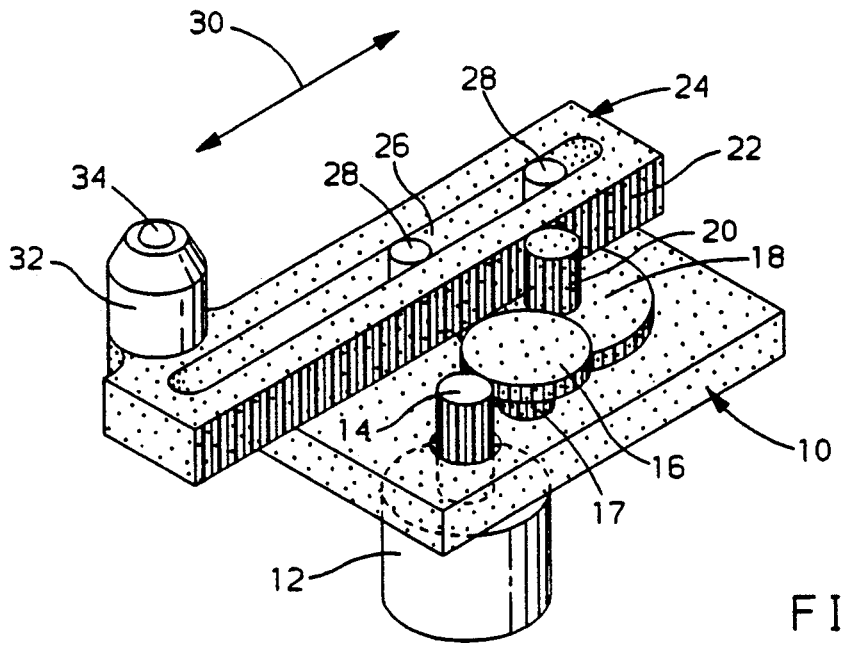
FIG. 1 is an illustration of the indexing means of the apparatus of this invention.

Referring to FIG. 1, the means for indexing the optical element shown comprises base lot including stepper motor 12, which drives gear 14, which meshes with intermediate gear 16. Intermediate gear 16 includes a smaller gear 17 that meshes with gear 18 to drive a rack and pinion mechanism comprising pinion gear 20 and rack 24, which includes teeth 22.

Rack 24 includes a slot 26 that allows indexing of the rack 24 in the direction of arrows 30, guided by pins 28 mounted to the housing 10. The rack 24 indexes optical element 32 when motive force is applied by motor 12. While conventional racks need only index the optical element under the surface of the optical disc, according to this invention, rack 24 is extended to be longer than conventional racks and slot 26 is likewise elongated. This improved rack structure allows the indexing means greater range of movement and allows movement of the optical element into a cleaning position exterior of the perimeter of the optical disc.

Figure 2:
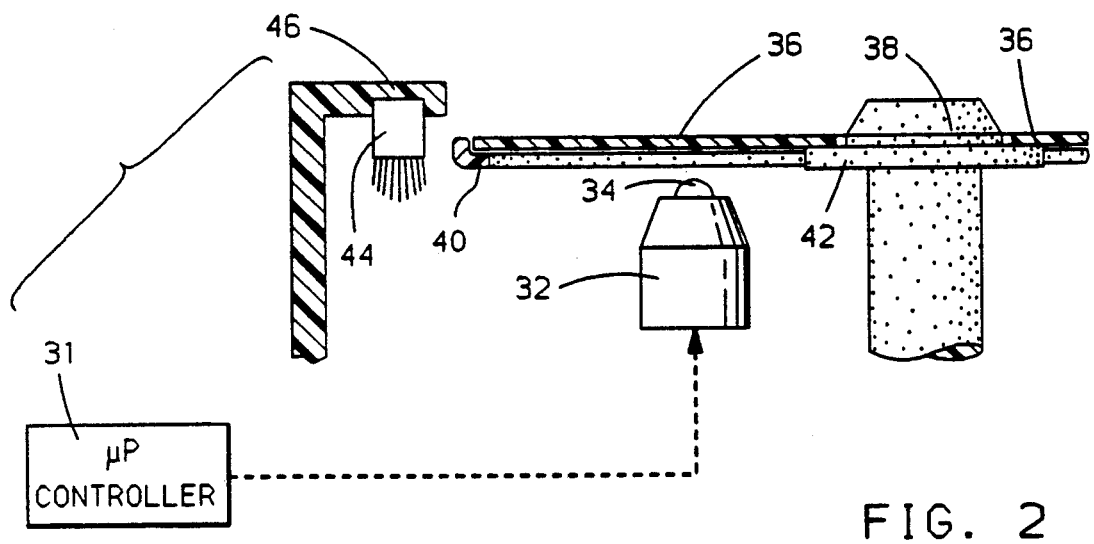
FIG. 2 is an illustration of the apparatus of this invention, including the cleaning brush and the optical element.

Referring to FIG. 2, a side view of the apparatus of this invention is shown with the indexing means omitted. In the optical disc apparatus, the optical disc 36, which is a CD or other type of optical disc, is mounted on turntable 42 and rotated by rotation of rotary shaft 38 during normal play conditions. The controls of the optical disc apparatus (not shown, but well known to those skilled in the art) control the indexing means shown in FIG. 1 to index the optical element 32 to collect information from the optical disc 36, for example, to play back music or retrieve data via light energy sent and received through lens 34. The indexing means is operated in response to microprocessor controller 31, which runs a control program capable of operating the optical disc system and responding to data retrieved from optical disc 36. Exterior of the inner housing 40, a cleaning brush 44 is mounted to the outer housing 46 as shown.

Figure 3:
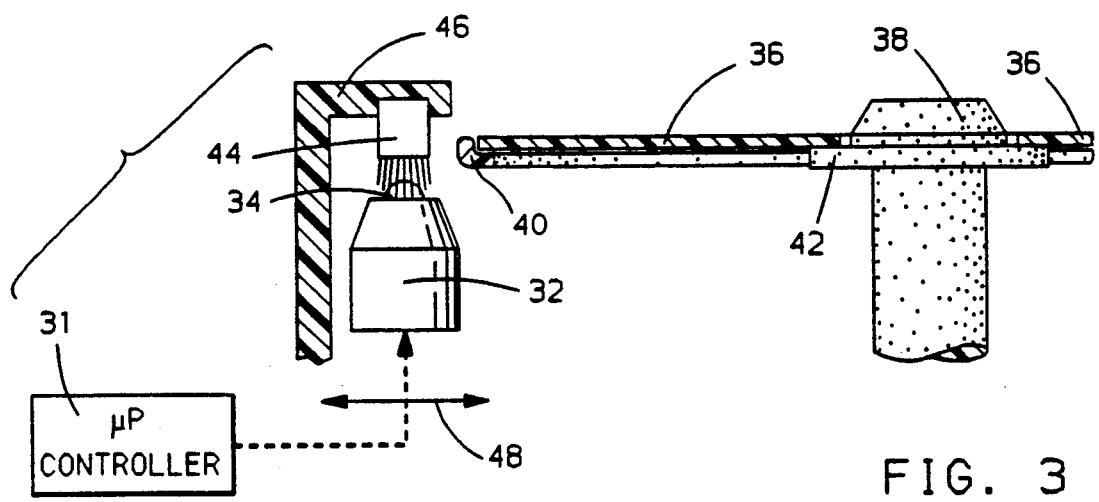
FIG. 3 is an illustration of the apparatus of this invention illustrating the cleaning function.

Referring to FIG. 3, the apparatus of this invention advantageously indexes the optical element exterior of the perimeter of the optical disc 36, into the vicinity of brush 44. This brings lens 34 into contact with brush 44, effectively removing dust and debris from lens 34, advantageously clean lens 34.

Advantageously, according to this invention, the stepper motor 12 may be reversibly driven to procure a brushing motion in the direction of arrows 48 to affect a more vigorous cleaning of the lens 34. The cleaning of the lens 34 may be done either (1) after insertion of the optical disc 34 and prior to data retrieval, (2) after removal of optical disc 36 or (3) anytime during the operation of the device. Control of the indexing means to perform the desired cleaning operation may be easily implemented by one skilled in the art.

Referring to FIG. 4, an optical disc 78 is shown having a perimeter 72, within which is region 74 where data is stored and from where data is retrieved by the optical element. Outside of perimeter, 72, reference 76 represents the area for placement of the cleaning brush 44 according to this invention.

Referring to FIG. 5, an optional implementation according to this invention includes the modified brush apparatus 44' shown. Brush apparatus 44' contains a row of bristles on the underside of its entire arcuate surface. The brushing apparatus 44' is indexable in the direction of arrows 56 and is controlled by the system microprocessor controller to index a small distance in the direction of arrows 56 after a predetermined number of cleanings of lens 34 of optical element 32. Periodic indexing of brush apparatus 44' periodically provides unused and clean bristles for use in cleaning of optical element 34.

Indexing is achieved through motor 52 having a gear 54 meshing with teeth 50 on the side of brush 44'. Those skilled in the art may easily implement, with microprocessor controller 31 (FIGS. 2 and 3), the required control of motor 52.

Referring to FIG. 6, the method of this invention is illustrated comprising the steps of (a) data retrieval or normal play (block 60), (b) cessation of data retrieval or stopping play (block 62), (c) removal of the optical disc (block 64), (d) controlling the indexing motor to move the optical pick-up to a brush located exterior the perimeter region for optical disc (block 66), indexing the optical pickup under the brush to effect removal of dust and debris from the lens of the optical element (block 68) and waiting for the next CD (block 70). Those skilled in the art can easily program into microprocessor controller 31 (FIGS. 2 and 3) the necessary commands to perform the method of this invention shown in FIG. 6 and the variations thereof described herein.

Those skilled in the art readily understand that this invention applies to all types of optical discs that use an optical element that may collect dust and/or debris. This invention is equally advantageous in audio CD systems, CD ROM systems and optical disc drive systems.

In the above described examples of this invention, the cleaning brush is either fixedly mounted as shown in FIG. 3 or periodically indexed as shown in FIG. 5. Also encompassed by this invention are implementations of cleaning movement into the cleaning brush. For example, the cleaning brush may be mounted to the shaft of a motor, exterior the perimeter of the optical disc, which motor spins the cleaning brush to facilitate cleaning of the optical element. Also encompassed by this invention are movements of the brush such as back-and-forth scrubbing motions, which movements can be implemented by those skilled in the art through a variety of mechanisms. An example of such an implementation, in the apparatus shown in FIG. 5, would be to reversibly drive motor 52 when optical element 34 is in contact with the bristles of brush 44'.

The above described implementations of this invention are example implementations and are not limiting on the scope of this invention. Moreover, various other improvements and modifications to this invention may occur to those skilled in the art and will fall within the scope of this invention as set forth below.

The embodiments of the invention in which an exclusive property or privilege is claimed are defined as follows:

1. An apparatus comprising:
   (a) means for indexing an optical element in a optical disc system across an optical disc enabling the optical element to read information from the optical disc;
   (b) means for indexing the optical element to a cleaning position exterior of an outer perimeter of the optical disc;
   (c) brush means, located exterior of the outer perimeter of the optical disc, for removing debris from the optical element;
   (d) means for bringing the optical element in contact with the brush means to affect removal of accumulated debris from the optical element, wherein the brush means comprises
   a row of brushes, and
   means for periodically indexing the row of brushes to periodically provide clean brushes for use in cleaning the optical element.

* * * * *